(12) United States Patent
Zhong et al.

(10) Patent No.: US 12,510,785 B2
(45) Date of Patent: Dec. 30, 2025

(54) DISPLAY MODULE AND DISPLAY DEVICE HAVING MIDDLE FRAME OF BACKLIGHT MODULE WITH FIRST STRIP-SHAPED PORTION AND SECOND STRIP-SHAPED PORTION

(71) Applicants: BEIJING BOE DISPLAY TECHNOLOGY CO., LTD., Beijing (CN); BOE TECHNOLOGY GROUP CO., LTD., Beijing (CN)

(72) Inventors: Wei Zhong, Beijing (CN); Haijun Shi, Beijing (CN); Changjia Fu, Beijing (CN); Fanwen Yin, Beijing (CN); Haiyan Wan, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/703,191

(22) PCT Filed: Feb. 24, 2023

(86) PCT No.: PCT/CN2023/078078
§ 371 (c)(1),
(2) Date: Apr. 19, 2024

(87) PCT Pub. No.: WO2023/160643
PCT Pub. Date: Aug. 31, 2023

(65) Prior Publication Data
US 2024/0411179 A1 Dec. 12, 2024

(30) Foreign Application Priority Data
Feb. 28, 2022 (CN) .................. 202210191400.X

(51) Int. Cl.
*G02F 1/1335* (2006.01)
*F21V 8/00* (2006.01)

(52) U.S. Cl.
CPC ..... *G02F 1/133614* (2021.01); *G02B 6/0043* (2013.01); *G02B 6/0051* (2013.01); *G02B 6/0088* (2013.01)

(58) Field of Classification Search
CPC ......... G02F 1/133614; G02F 1/133615; G02B 6/0043; G02B 6/0051; G02B 6/0088; G02B 6/0073
See application file for complete search history.

(56) References Cited

U.S. PATENT DOCUMENTS

2020/0018885 A1* 1/2020 Wang .................. G02B 6/0036
2021/0191184 A1* 6/2021 Zhang ............... G02F 1/133608
(Continued)

FOREIGN PATENT DOCUMENTS

CN 106597747 A 4/2017
CN 207457653 U 6/2018
(Continued)

OTHER PUBLICATIONS

Wang et al., CN_209328399, machine transition (Year: 2019).*
(Continued)

*Primary Examiner* — Tracie Y Green
(74) *Attorney, Agent, or Firm* — Scully, Scott, Murphy & Presser, P.C.

(57) ABSTRACT

A display module and a display device are provided, the display module includes a backlight module and a display panel, which includes: a backplane, including a bottom plate and a side plate; an optical element arranged at a side of the bottom plate close to the display panel; a light-emitting element at a side of the side plate close to the optical element; a middle frame between the bottom plate and the (Continued)

display panel, the middle frame includes a first strip-shaped portion; a first included angle is formed between at least part of the first strip-shaped portion and a surface of the optical element close to the display panel; an orthographic projection of the first strip-shaped portion on the display panel at least overlaps with an orthographic projection of an edge of the optical element close to the light-emitting element on the display panel.

19 Claims, 8 Drawing Sheets

(56) References Cited

U.S. PATENT DOCUMENTS

| | | | | |
|---|---|---|---|---|
| 2021/0397036 | A1* | 12/2021 | Guo | G02F 1/133317 |
| 2022/0146744 | A1* | 5/2022 | Li | G02F 1/133613 |
| 2024/0429215 | A1* | 12/2024 | Ke | G09F 9/3026 |

FOREIGN PATENT DOCUMENTS

| | | |
|---|---|---|
| CN | 209328399 U | 8/2019 |
| CN | 209880030 U | 12/2019 |
| CN | 112068353 A | 12/2020 |
| CN | 215116870 U | 12/2021 |
| CN | 113885255 A | 1/2022 |
| CN | 113947995 A | 1/2022 |
| CN | 114488619 A | 5/2022 |

OTHER PUBLICATIONS

Jiang, CN106597747, machine translation (Year: 2017).*
International Search Report and Written Opinion dated May 23, 2023 received in International Application No. PCT/CN2023/078078.
Office Action dated Oct. 26, 2022 received in Chinese Patent Application No. 202210191400.X.

* cited by examiner

DISPLAY MODULE AND DISPLAY DEVICE HAVING MIDDLE FRAME OF BACKLIGHT MODULE WITH FIRST STRIP-SHAPED PORTION AND SECOND STRIP-SHAPED PORTION

CROSS-REFERENCE TO RELATED APPLICATIONS

The present application is a U.S. National Phase application of PCT/CN2023/078078 filed on Feb. 24, 2023 which claims priority to Chinese Patent Application No. 202210191400.X filed on Feb. 28, 2022, and the entire contents of each of which are hereby incorporated by reference as a part of the present application.

TECHNICAL FIELD

Embodiments of the present disclosure relate to a display module and a display device.

BACKGROUND

At present, most liquid crystal display devices are backlight liquid crystal display devices. A backlight liquid crystal display device includes a housing as well as a liquid crystal display panel and a backlight module which are arranged in the housing. The liquid crystal display panel includes a color filter substrate, a thin film transistor array substrate (TFT array substrate), and a liquid crystal layer sandwiched between the color filter substrate and the TFT array substrate. The working principle of the liquid crystal display panel is to apply a driving voltage to the color filter substrate and the TFT array substrate to control a rotation of liquid crystal molecules in the liquid crystal layer, and to refract light of the backlight module for display. The liquid crystal display panel itself does not emit light, so a light source provided by the backlight module is required for normal display.

According to different light incident positions of light sources, backlight modules are classified into edge-lit backlight modules and direct-lit backlight modules. In the direct-lit backlight module, a light source (for example, a cold cathode fluorescent lamp (CCFL) or a light-emitting diode (LED)) that emits light is arranged behind a liquid crystal display panel and is directly formed as a surface light source to be supplied to the liquid crystal display panel. In the edge-lit backlight module, an LED light bar used as a backlight source is arranged at an edge of a backplane at a rear side of the liquid crystal display panel, so that light emitted by the LED light bar enters a light guide plate (LGP) through a light incident surface at a side of the light guide plate, exits through a light emergent surface of the light guide plate after reflection and diffusion, and then passes through an assembly of optical films so as to be formed as a surface light source for supplying the liquid crystal panel.

SUMMARY

At least one embodiment of the present disclosure provides a display module and a display device including the display module. In the display module, a first strip-shaped portion included in a middle frame extends to be above an optical element from a position close to a display panel towards a position away from the display panel, and an orthographic projection of the first strip-shaped portion on the display panel at least overlaps with an orthographic projection of an edge of the optical element close to a light-emitting element on the display panel, so that the problem of light and dark zone occurred at an edge of a splicing screen formed by splicing the display modules can be solved, and a thickness of the splicing screen is smaller than that of a mainstream direct-lit splicing screen.

At least one embodiment of the present disclosure provides a display module, and the display module comprises a backlight module and a display panel, the backlight module comprises: a backplane, comprising a bottom plate and a side plate; an optical element arranged at a side of the bottom plate close to the display panel; a light-emitting element arranged at a side of the side plate close to the optical element; and a middle frame arranged between the bottom plate and the display panel, in which the middle frame comprises a first strip-shaped portion extending to be above the optical element from a position close to the display panel towards a position away from the display panel; a first included angle is formed between at least part of the first strip-shaped portion and a surface of the optical element close to the display panel, and the first included angle is an acute angle or a right angle; an orthographic projection of the first strip-shaped portion on the display panel at least overlaps with an orthographic projection of an edge of the optical element close to the light-emitting element on the display panel.

For example, in the display module provided by least one embodiment of the present disclosure, the optical element comprises a light guide plate, and the light guide plate is configured to receive light emitted from the light-emitting element and to guide the light to the display panel.

For example, in the display module provided by least one embodiment of the present disclosure, a surface of the light guide plate away from the display panel is provided with an auxiliary scattering structure, and the auxiliary scattering structure is configured to scatter light incident into the light guide plate.

For example, in the display module provided by least one embodiment of the present disclosure, the auxiliary scattering structure comprises a plurality of protrusion structures protruding towards a side close to the display panel.

For example, in the display module provided by least one embodiment of the present disclosure, the optical element further comprises a quantum dot film layer arranged at a side of the light guide plate close to the display panel, and the first strip-shaped portion extends to be above the quantum dot film layer and is connected with the quantum dot film layer.

For example, in the display module provided by least one embodiment of the present disclosure, the quantum dot film layer comprises a first quantum dot film layer, a second quantum dot film layer and a third quantum dot film layer which are sequentially arranged adjacent to each other in a direction parallel to a main surface of the display panel, and a color of light emitted from the first quantum dot film layer, a color of light emitted from the second quantum dot film layer and a color of light emitted from the third quantum dot film layer are different from each other.

For example, in the display module provided by least one embodiment of the present disclosure, a direction perpendicular to a main surface of the display panel is a first direction, and the middle frame further comprises a second strip-shaped portion which is approximately parallel to the first direction and extends from a position close to the display panel towards a position away from the display panel along the first direction, and the second strip-shaped portion is connected with the first strip-shaped portion.

For example, in the display module provided by least one embodiment of the present disclosure, a cross-sectional shape of the first strip-shaped portion is a straight line, the first strip-shaped portion is obliquely arranged relative to the second strip-shaped portion, and the first included angle is an acute angle.

For example, in the display module provided by least one embodiment of the present disclosure, a cross-sectional shape of the first strip-shaped portion is a broken line, and the first included angle formed between a part of the first strip-shaped portion close to the optical element and a main surface of the bottom plate is a right angle.

For example, in the display module provided by least one embodiment of the present disclosure, the light-emitting element and a surface of the side plate close to the optical element are connected through a first adhesive.

For example, in the display module provided by least one embodiment of the present disclosure, the optical element further comprises a reflective structure arranged at a side of the light guide plate close to the bottom plate and a light diffusion structure arranged at a side of the light guide plate away from the bottom plate, in which the reflective structure and the bottom plate are in full-surface bonding with each other through a second adhesive, the reflective structure and the light guide plate are in full-surface bonding with each other through a third adhesive, and the light guide plate and the light diffusion structure are in full-surface bonding with each other through a fourth adhesive.

For example, in the display module provided by least one embodiment of the present disclosure, a surface of the first strip-shaped portion close to the light guide plate is in direct contact with the light diffusion structure, or the surface of the first strip-shaped portion close to the light guide plate and the light diffusion structure are connected through a sixth adhesive.

For example, in the display module provided by least one embodiment of the present disclosure, the optical element further comprises a reflective structure arranged at a side of the light guide plate close to the bottom plate and a light diffusion structure arranged between the light guide plate and the quantum dot film layer, the reflective structure and the bottom plate are in full-surface bonding with each other through a second adhesive, the reflective structure and the light guide plate are in full-surface bonding with each other through a third adhesive, the light guide plate and the light diffusion structure are in full-surface bonding with each other through a fourth adhesive, and the quantum dot film layer and the light diffusion structure are in full-surface bonding with each other through a fifth adhesive.

For example, in the display module provided by least one embodiment of the present disclosure, a surface of the first strip-shaped portion close to the quantum dot film layer is in direct contact with the quantum dot film layer, or the surface of the first strip-shaped portion close to the quantum dot film layer and the quantum dot film layer are connected through a sixth adhesive.

For example, in the display module provided by least one embodiment of the present disclosure, the middle frame and the backplane are fixedly connected in a snap-fitted manner.

For example, in the display module provided by least one embodiment of the present disclosure, the display panel comprises a liquid crystal cell and an optical film layer, the optical film layer is arranged at a side of the liquid crystal cell close to the optical element, and the optical film layer and the liquid crystal cell are bonded with each other through a seventh adhesive.

For example, in the display module provided by least one embodiment of the present disclosure, the optical film layer comprises a brightness enhancement film and a diffusion film which are arranged in a laminated manner, and the diffusion film is arranged at a side of the brightness enhancement film close to the liquid crystal cell.

For example, in the display module provided by least one embodiment of the present disclosure, an outer frame is arranged at a side of the middle frame away from the optical element, the optical film layer is connected with the middle frame through a first connector, and the liquid crystal cell is connected with the outer frame through a second connector.

At least one embodiment of the present disclosure further provides a display device, and the display device comprises a splicing screen formed by a plurality of the display modules according to any one of the embodiments mentioned above.

For example, in the display device provided by at least one embodiment of the present disclosure, adjacent display modules are spliced together through a connecting adhesive tape.

BRIEF DESCRIPTION OF DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
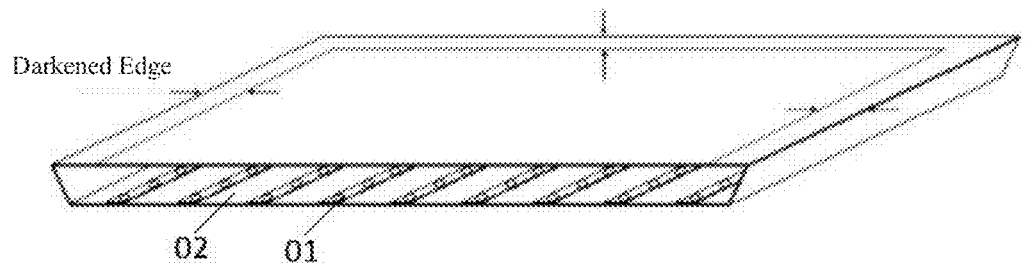
FIG. 1 is a schematic three-dimensional structure view of a display module adopting a direct-lit backlight.
Figure 2:
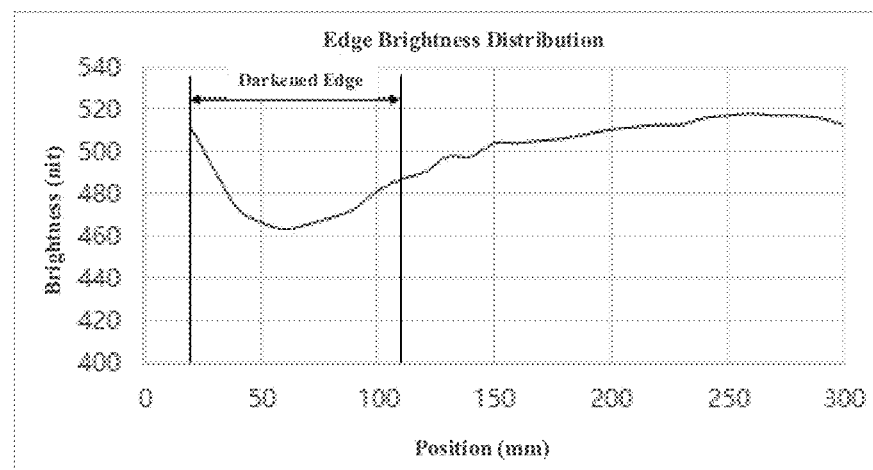
FIG. 2 is a schematic diagram illustrating a brightness distribution at an edge of the display module shown in FIG. 1.

At present, a direct-lit structural design is adopted by almost all the backlight sources used in splicing screens. For example, FIG. 1 is a schematic three-dimensional structure view of a display module adopting a direct-lit backlight. As shown in FIG. 1, a light-emitting diode (LED) light bar 01 is placed at a bottom of a backplane 02, and a surface light source as required is formed at a light mixing distance of about 30 mm by means of a diffuser plate and a film sheet which are cooperated with the LED light bar 01. However, in the structure shown in FIG. 1, the phenomenon that a displayed picture is darkened at a periphery is easily occurred. For example, FIG. 2 is a schematic diagram illustrating a brightness distribution at an edge of the display module shown in FIG. 1. As shown in FIG. 2, within a range of 20 mm to 120 mm from the display edge, the brightness curve presents a trend of dropping firstly and then rising, that is, it finally presents a downwardly concave trend, thus causing the problem that an edge area of the display module is darkened. For example, the problem of darkened edge of the display module is related to spatial-angular distribution characteristics of light intensity of lamp beads of the direct-lit LED light bar, the superimposition effect of light spots, and the reflection conditions at the edge slopes.

Figure 3:
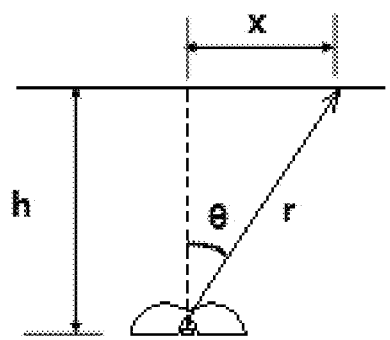
FIG. 3 is a schematic diagram of an optical path of light emitted by a single direct-lit LED lamp bead after being refracted.

For example, FIG. 3 is a schematic diagram of an optical path of light emitted by a single, direct-lit LED lamp bead after being refracted. As shown in FIG. 3, h is a distance between the LED lamp bead and the display panel; θ is a light-emitting angle; r is a diagonal distance from the LED lamp bead to a viewing point along a viewing angle under the condition that the light-emitting angle is θ; x is a distance between an orthographic projection of a center of the LED lamp bead on the display panel and the viewing point along the viewing angle in a direction parallel to a main surface of the display panel, and cos θ=h/r.

Figure 4:
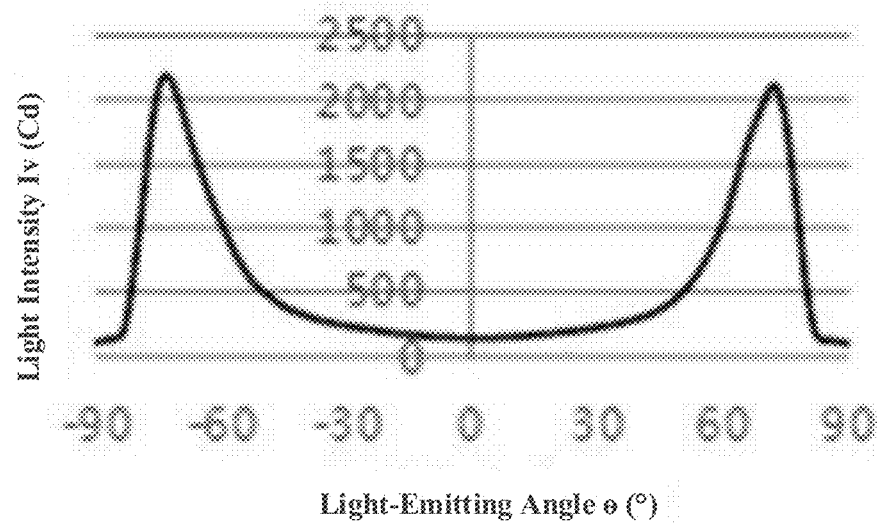
FIG. 4 is a schematic diagram illustrating a distribution of light intensity of light emitted by a single LED lamp bead with a light-emitting angle θ.
Figure 5:
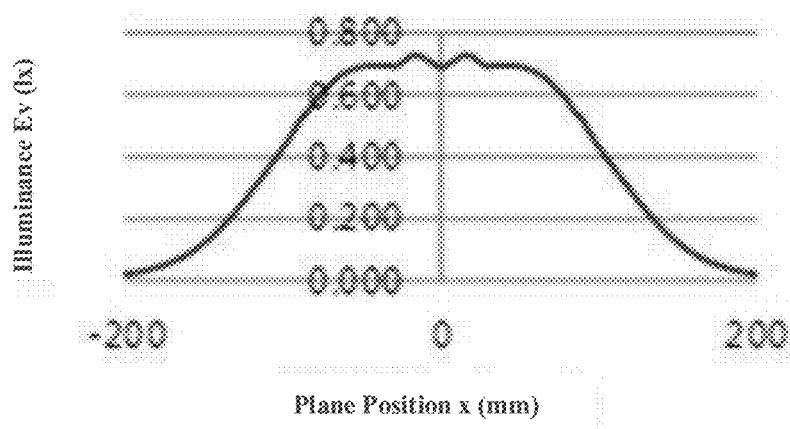
FIG. 5 is a distribution curve graph illustrating a variation of an illuminance Ev of a light spot corresponding to light emitted by a single LED lamp bead with a plane position X.

For example, FIG. 4 is a schematic diagram illustrating a distribution of light intensity of light emitted by a single LED lamp bead with a light-emitting angle θ; and FIG. 5 is a distribution curve graph illustrating a variation of an illuminance Ev of a light spot corresponding to light emitted by a single LED lamp bead with a plane position x. For example, as shown in FIG. 4, the light intensity Iv of the light emitted by a single LED lamp bead after being refracted by a prism is increased with an increase of the light-emitting angle θ, and the illuminance Ev of a single light spot directly above the single LED lamp bead can be calculated by the following formula:

$$Ev = Iv * \cos\theta/r2.$$

Figure 6:
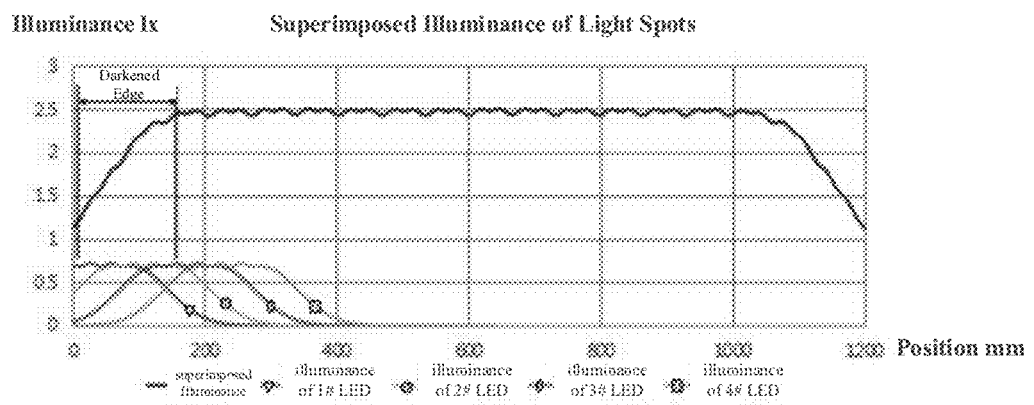
FIG. 6 is a one-dimensional distribution diagram illustrating superimposed light spots of direct-lit LED lamp beads after superimposition.

It can be concluded through calculation that the illuminance of the light spot of a single LED lamp bead is distributed with the plane position x. From the distribution curve, it can be seen that the light spot has a greater illuminance at a central area, and the illuminance of the light spot is gradually decreased as going further away from the central area. A one-dimensional illuminance distribution of a direct-lit, blue light-emitting surface can be obtained by arranging and overlapping the distribution curves of light spots corresponding to individual LED lamp beads at a certain interval. For example, FIG. 6 is a one-dimensional distribution diagram of superimposed light spots of direct-lit LED lamp beads after superimposition. As shown in FIG. 6, light spots of four LED lamp beads are superimposed, that is, the light spots of 1 # LED lamp bead, 2 # LED lamp bead, 3 # LED lamp bead and 4 # LED lamp bead are superimposed. As can be seen from FIG. 6, the illuminance of 1 # LED lamp bead remains stable in a position range of 0-100 mm, and presents a dropping trend in a position range of 100 mm-300 mm; the illuminance of 2 #LED lamp bead presents a rising trend in a position range of 0-50 mm, remains stable in a position range of 50 mm-180 mm, and presents a dropping trend in a position range of 180 mm-350 mm; the illuminance of 3 # LED lamp bead presents a rising trend in a position range of 0-120 mm, remains stable in a position range of 120 mm-220 mm, and presents a dropping trend in a position range of 220 mm-410 mm; the illuminance of 4 # LED lamp bead presents a rising trend in a position range of 0-180 mm, remains stable in a position range of 180 mm-300 mm, and presents a dropping trend in a position range of 300 mm-420 mm. In the illuminance curve obtained by superimposing the illuminances of four LED lamp beads, the closer the distance to the edge of the display panel, the weaker the illuminance of the light spot of the direct-lit LED lamp bead, and eventually, a darkened region is formed at the edge of the display module. For example, in FIG. 6, in the illuminance curve obtained after superimposition, the illuminance of the light spot remains a stable trend in the central area and presents a dropping trend at both ends.

Figure 7:
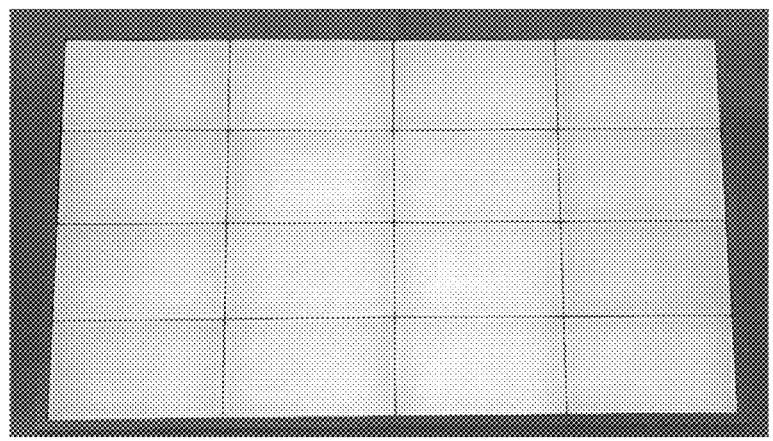
FIG. 7 is a schematic diagram illustrating a display effect of a splicing screen formed by splicing display modules with darkened edges.

Furthermore, since the edge area of the display module is darkened, the display effect of a splicing screen formed by splicing a plurality of display modules will also be affected, resulting in the overall uniformity of the splicing screen is poor. For example, FIG. 7 is a schematic diagram illustrating a display effect of a splicing screen formed by splicing display modules with darkened edges. As shown in FIG. 7, the darkened phenomenon will be appeared at a splicing seam of adjacent display modules, which will eventually result in poor display effect of the splicing screen as formed. How to eliminate the defection of darkened edges of splicing units is a problem to be solved in the field of splicing display.

The inventor(s) of the present disclosure noticed that an LED light bar may be adhered onto a side surface of a backplane, and light emitted by the LED light bar will be formed into an uniform, primary, surface light source after passing through a light guide plate arranged at a bottom of the backplane, then an inclined portion of a middle frame with a large inclination angle is utilized to shield an edge of the primary surface light source, and the light is mixed in a spaced region between the light guide plate and the display panel, so that a secondary surface light source finally achieves the same picture display effect, at the periphery, as that of the primary surface light source. When the finally obtained display module is applied to a splicing screen, the uniformity of peripheral brightness of the splicing screen can be ensured, the resultant visual effect of the splicing screen for display can be improved, the thickness of the finally formed splicing screen can be reduced, and also the cost of the LEDs can be saved by combining the characteristics of peripheral picture uniformity of edge-lit backlight with the advantages of realizable ultra-slim bezel of direct-lit backlight. The display module with such structure can also solve the problem of light and dark zone occurred at the edge when applied to a splicing display screen, and the thickness of such splicing screen is smaller than that of a mainstream direct-lit splicing screen. Furthermore, based on such structure, a quantum dot film is placed at a side of the light guide plate close to the display panel, an inclined portion of the middle frame shields an edge of the quantum dot film, and a blue-colored LED light bar is utilized in matching therewith, so as to achieve a splicing screen with an ultra-slim bezel and a display effect of high color gamut, and to solve the problem prone to be occurred in the quantum dot film that an invalid blue-colored light-emitting region enters a visual area.

At least one embodiment of the present disclosure provides a display module, and the display module includes a backlight module and a display panel. The backlight module includes a backplane, an optical element, a light-emitting element and a middle frame; the backplane includes a bottom plate and a side plate, the optical element is arranged at a side of the bottom plate close to the display panel, the light-emitting element is arranged at a side of the side plate close to the optical element, the middle frame is arranged between the bottom plate and the display panel and includes a first strip-shaped portion which extends to be above the optical element from a position close to the display panel towards a position away from the display panel, a first included angle is formed between at least part of the first strip-shaped portion and a surface of the optical element close to the display panel, and the first included angle is an acute angle or a right angle; and an orthographic projection of the first strip-shaped portion on the display panel at least overlaps with an orthographic projection of an edge of the optical element close to the light-emitting element on the display panel. The display module combines the characteristics of peripheral picture uniformity of edge-lit backlight with the advantages of realizable ultra-slim bezel of direct-lit backlight. When the display module is applied to a splicing screen product, the uniformity of peripheral brightness of the splicing screen can be ensured, the visual effect of the splicing screen for display can be improved, and also the thickness of the splicing screen product can be reduced, so that the cost of light-emitting elements can be saved.

Figure 8:
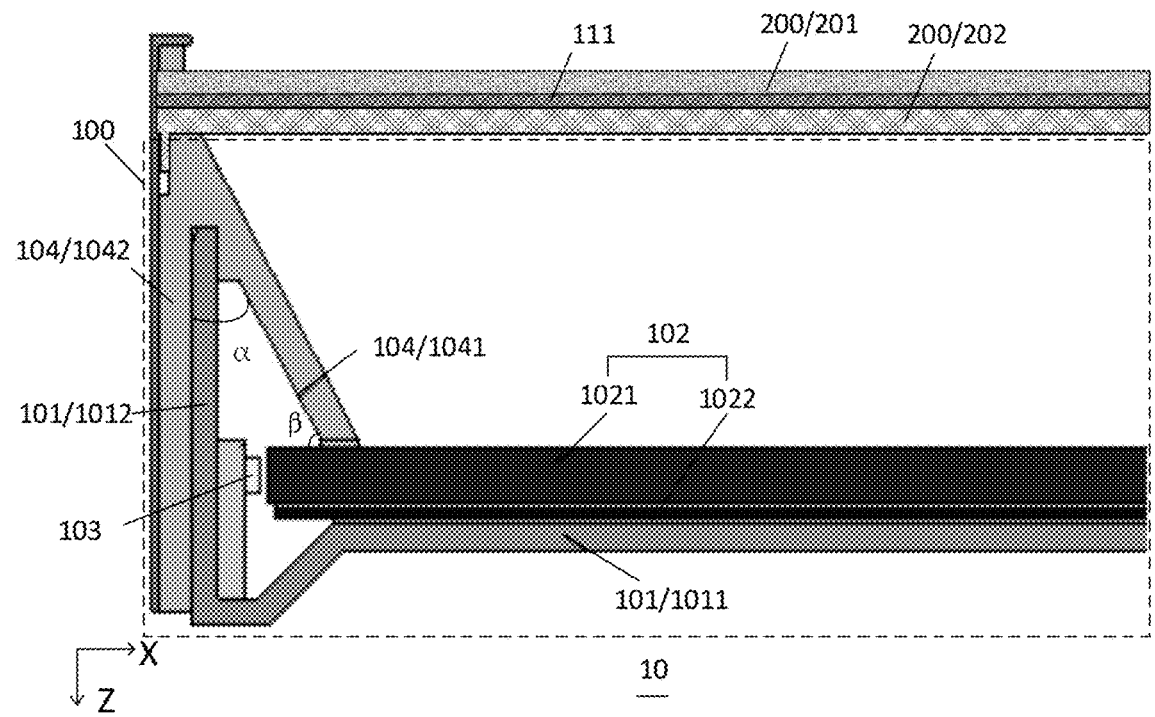
FIG. 8 is a schematic cross-sectional structural view of a display module provided by at least one embodiment of the present disclosure.

For example, FIG. 8 is a schematic cross-sectional structural view of a display module provided by at least one embodiment of the present disclosure. As shown in FIG. 8, the display module 10 includes a backlight module 100 and a display panel 200. The backlight module 100 includes a backplane 101, an optical element 102, a light-emitting element 103 and a middle frame 104. The backplane 101 includes a bottom plate 1011 and a side plate 1012. The optical element 102 is arranged at a side of the bottom plate 1011 close to the display panel 200, the light-emitting element 103 is arranged at a side of the side plate 1012 close to the optical element 102, the middle frame 104 is arranged between the bottom plate 1011 and the display panel 200, and the middle frame 104 includes a first strip-shaped portion 1041. The first strip-shaped portion 1041 extends to be above the optical element 102 from a position close to the display panel 200 towards a position away from the display panel 200. A direction perpendicular to a main surface of the display panel 200 is a first direction Z, and a second direction X is perpendicular to the first direction Z. For example, an extending direction of the optical element 102 is parallel to or approximately parallel to the second direction X, and an extending direction of the side plate 1012 is parallel to or approximately parallel to the first direction Z. A first included angle $\beta$ is formed between at least part of the first strip-shaped portion 1041 and a surface of the optical element 102 close to the display panel 200, and the first included angle $\beta$ is an acute angle or a right angle. An orthographic projection of the first strip-shaped portion 1041 on the display panel 200 at least overlaps with an orthographic projection of an edge of the optical element 102 close to the light-emitting element 103 on the display panel 200. The display module 10 combines the characteristics of peripheral picture uniformity of edge-lit backlight with the advantages of realizable ultra-slim bezel of direct-lit backlight. When the display module 10 is applied to a splicing screen product, the uniformity of peripheral brightness of the splicing screen can be ensured, the visual effect of the splicing screen for display can be improved, and also the thickness of the finally obtained splicing screen product can be reduced, so that the cost of light-emitting elements can be saved.

For example, in the structure shown in FIG. 8, the middle frame 104 further includes a second strip-shaped portion 1042 which is approximately parallel to the first direction Z and extends from a position close to the display panel 200 towards a position away from the display panel 200, and the second strip-shaped portion 1042 is connected with the first strip-shaped portion 1041 at an end close to the display panel 200. A cross-sectional shape of the second strip-shaped portion 1042 is a long strip shape, and a cross-sectional shape of the first strip-shaped portion 1041 is also a long strip shape, and one end of the second strip-shaped portion 1042 is connected with one end of the first strip-shaped portion 1041, so that the first strip-shaped portion 1041 is obliquely arranged relative to the second strip-shaped portion 1042, and that a second included angle $\alpha$ is formed between the second strip-shaped portion 1042 and the first strip-shaped portion 1041, and the second included angle $\alpha$ is an acute angle; the other end of the first strip-shaped portion 1041 extends to a side of the optical element 102 close to the display panel 200 so as to be connected with the optical element 102. The embodiment of the present disclosure is not limited to the configuration that the cross-sectional shape of the first strip-shaped portion 1041 is a long strip shape; in some other examples, the cross-sectional shape of the first strip-shaped portion 1041 can also be a broken line shape, an arc shape or the like, which is not limited in the embodiment of the present disclosure.

For example, as shown in FIG. 8, the first strip-shaped portion 1041 of the middle frame 104 can shield an edge of the optical element 102 to improve the poor uniformity of peripheral light of the display panel 200. It should be noted that the edge of the optical element 102 close to the light-emitting element 103 refers to a region which extends from an end of the optical element 102 close to the light-emitting element 103 to a side away from the light-emitting element 103 and has a length in the range of 0 to 180 mm. Such region can improve the uniformity of picture display of the display module when shielded by the first strip-shaped portion 1041.

For example, in an example, the optical element 102 includes a light guide plate 1021, and the light guide plate is configured to receive light emitted from the light-emitting element 103 and guide the light to the display panel 200; and the other end of the first strip-shaped portion 1041 extends to a side of the light guide plate 1021 close to the display panel 200 so as to be connected with the light guide plate 1021; that is to say, no other layer structure is provided at the side of the light guide plate 1021 close to the display panel 200.

For example, as shown in FIG. 8, the light guide plate 1021 can distribute the light emitted from the light-emitting element 103 over the entire surface of the optical element 102 by means of total reflection, which is beneficial to improving the utilization ratio of the light-emitting element 103 of the display module 10. The light guide plate 1021 can also ensure the uniformity of the emitted light, the emitted light can be reflected by the first strip-shaped portion 1041 of the middle frame 104, and finally a vertical distance between the display panel 200 and the optical element 102 in the direction perpendicular to the main surface of the display panel 200 can be decreased, that is, a light mixing distance of the emitted light can be shortened, so that the thickness of the finally formed display module can be reduced.

For example, the backplane 101 is made of an iron plate, and a thickness of the backplane 101 is 0.6 mm to 1.2 mm.

For example, the light-emitting element 103 includes a plurality of LED lamps arranged side by side, or it may be an LED light bar, which is not limited in the embodiment of the present disclosure.

For example, the display panel 200 may include an array substrate and a color filter substrate arranged opposite to each other, and a liquid crystal layer is arranged between the array substrate and the color filter substrate. For example, in the display panel 200, a plurality of gate lines and a plurality of data lines are arranged on the array substrate to define a plurality of pixel units, and a thin film transistor and a pixel electrode are arranged in each of the pixel units, a gate electrode of the thin film transistor is electrically connected with the gate line, a source electrode of the thin film transistor is electrically connected with the data line, and a drain electrode of the thin film transistor is electrically connected with the pixel electrode. The color filter substrate includes a grid-like black matrix and a plurality of color resistances arranged in an array in openings of the black matrix; the color resistances include red color resistances, green color resistances and blue color resistances. Liquid crystal molecules are controlled to be deflected by means of an electric field between the pixel electrode and a common electrode, so as to achieve the display effect. For example, other structures included in the display panel 200 can refer to the conventional design, and will not be described in details herein.

Figure 9:
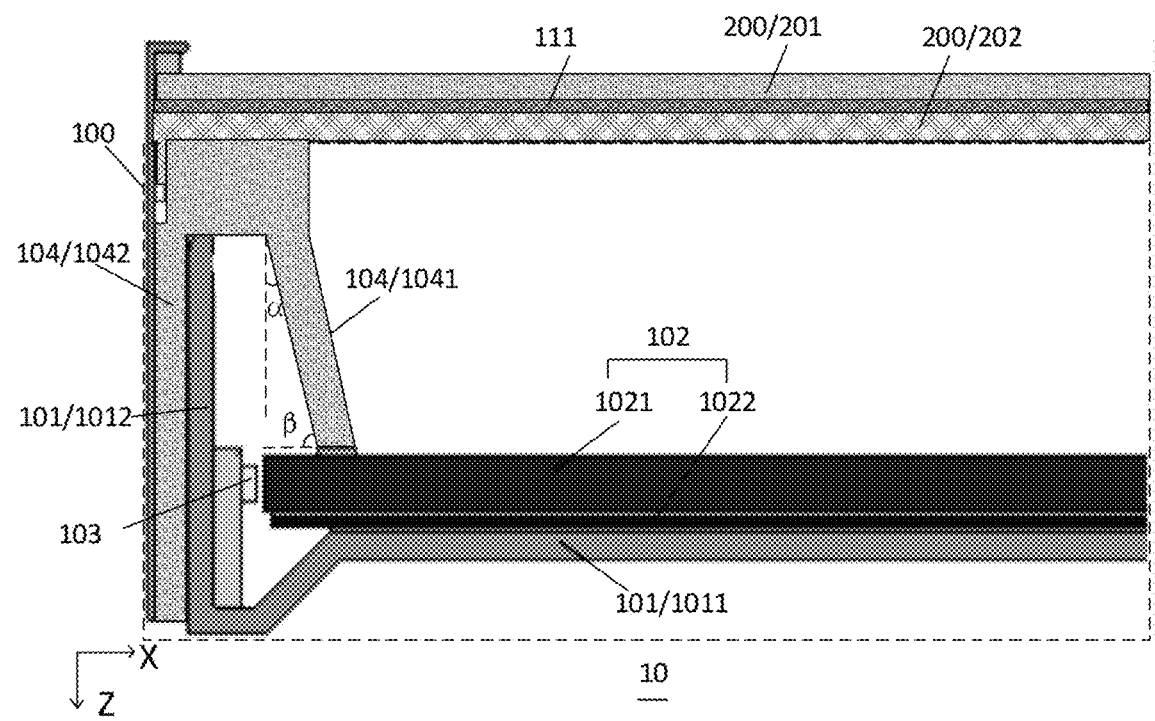
FIG. 9 is a schematic cross-sectional structural view of another display module provided by at least one embodiment of the present disclosure.

For example, FIG. 9 is a schematic cross-sectional structural view of another display module provided by at least one embodiment of the present disclosure. The display module 10 shown in FIG. 9 is different from the display module 10 shown in FIG. 8 in that the cross-sectional shape of the first strip-shaped portion 1041 included in the middle frame 104 is a broken line shape. For example, a first included angle $\beta$ is formed between at least part of the first strip-shaped portion 1041 and the first direction Z, and the first included angle $\beta$ is an acute angle. A first included angle $\beta$ is formed between a part of the first strip-shaped portion 1041 close to the optical element 102 and the second direction X, and the first included angle $\beta$ is an acute angle; that is, the first included angle $\beta$ is formed between the part of the first strip-shaped portion 1041 close to the optical element 102 and a surface of the optical element 102 close to the display panel 200. The first strip-shaped portion 1041 further includes a part substantially parallel to the main surface of the optical element 102, and an orthographic projection of the first strip-shaped portion 1041 on the display panel 200 at least overlaps with an orthographic projection of an edge of the optical element 102 close to the light-emitting element 103 on the display panel 200. The display module 10 combines the characteristics of peripheral picture uniformity of edge-lit backlight with the advantages of realizable ultra-slim bezel of direct-lit backlight. When the display module 10 is applied to a splicing screen product, the uniformity of peripheral brightness of the splicing screen can be ensured, the visual effect of the splicing screen for display can be improved, and also the thickness of the finally obtained splicing screen product can be reduced, so that the cost of the light-emitting elements can be saved.

For example, as shown in FIG. 9, the first strip-shaped portion 1041 of the middle frame 104 can shield an edge of the optical element 102 to improve the poor uniformity of peripheral light of the display panel 200. It should be noted that the edge of the optical element 102 close to the light-emitting element 103 refers to a region which extends from an end of the optical element 102 close to the light-emitting element 103 to a side away from the light-emitting element 103 and has a length in the range of 0 to 180 mm. Such region can improve the uniformity of picture display of the display module when shielded by the first strip-shaped portion 1041.

Figure 10:
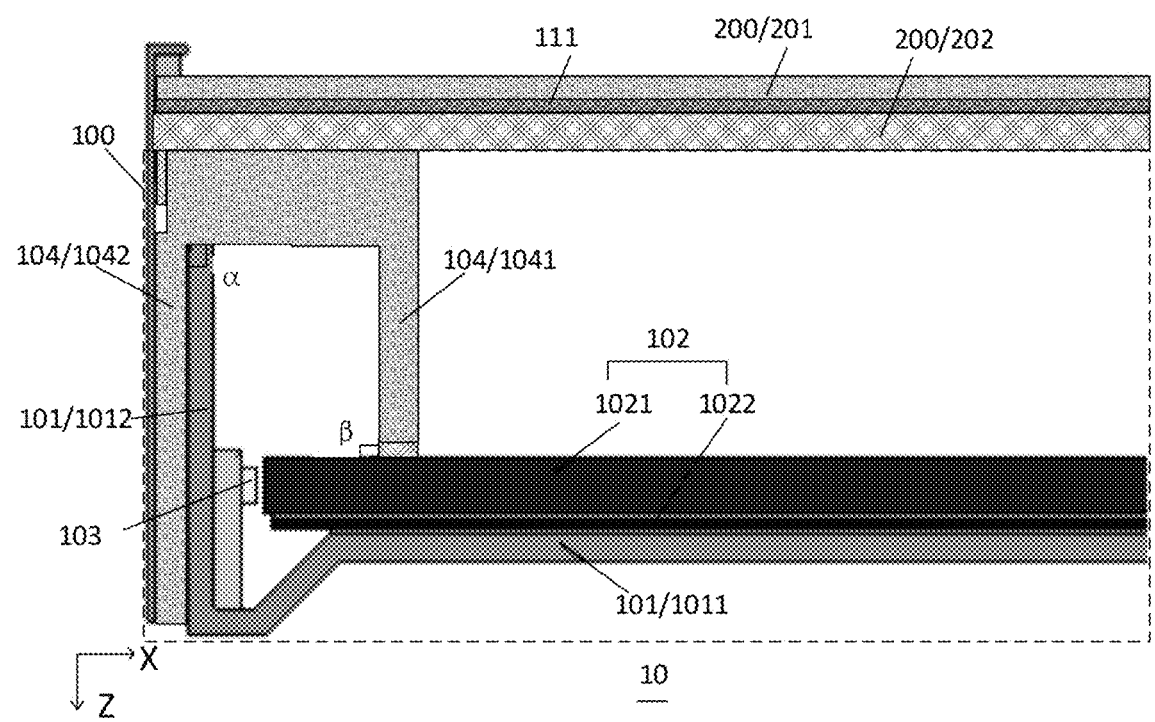
FIG. 10 is a schematic cross-sectional structural view of yet another display module provided by at least one embodiment of the present disclosure.

For example, FIG. 10 is a schematic cross-sectional structural view of yet another display module provided by at least one embodiment of the present disclosure. The display module 10 shown in FIG. 10 is different from the display module 10 shown in FIG. 8 in that the cross-sectional shape of the first strip-shaped portion 1041 included in the middle frame 104 is a broken line shape. For example, a first included angle $\beta$ between at least part of the first strip-shaped portion 1041 and the first direction Z is a right angle; that is, a first included angle $\beta$ between a part of the first strip-shaped portion 1041 close to the optical element 102 and a surface of the optical element 102 close to the display panel 200 is a right angle. The first strip-shaped portion 1041 further includes a part substantially parallel to the main surface of the optical element 102, and a second included angle α between the part of the first strip-shaped portion 1041 substantially parallel to the main surface of the optical element 102 and the second strip-shaped portion 1042 is a right angle. An orthographic projection of the first strip-shaped portion 1041 on the display panel 200 at least overlaps with an orthographic projection of an edge of the optical element 102 close to the light-emitting element 103 on the display panel 200. The display module 10 combines the characteristics of peripheral picture uniformity of edge-lit backlight with the advantages of realizable ultra-slim bezel of direct-lit backlight. When the display module 10 is applied to a splicing screen product, the uniformity of peripheral brightness of the splicing screen can be ensured, the visual effect of the splicing screen for display can be improved, and also the thickness of the finally obtained splicing screen product can be reduced, so that the cost of light-emitting elements can be saved.

For example, as shown in FIG. 10, the first strip-shaped portion 1041 of the middle frame 104 can shield an edge of the optical element 102 to improve the poor uniformity of peripheral light of the display panel 200. It should be noted that the edge of the optical element close to the light-emitting element refers to a region which extends from an end of the optical element close to the light-emitting element to a side away from the light-emitting element and has a length in the range of 0 to 180 mm. Such region can improve the uniformity of image display of the display module when shielded by the first strip-shaped portion 1041.

Figure 11:
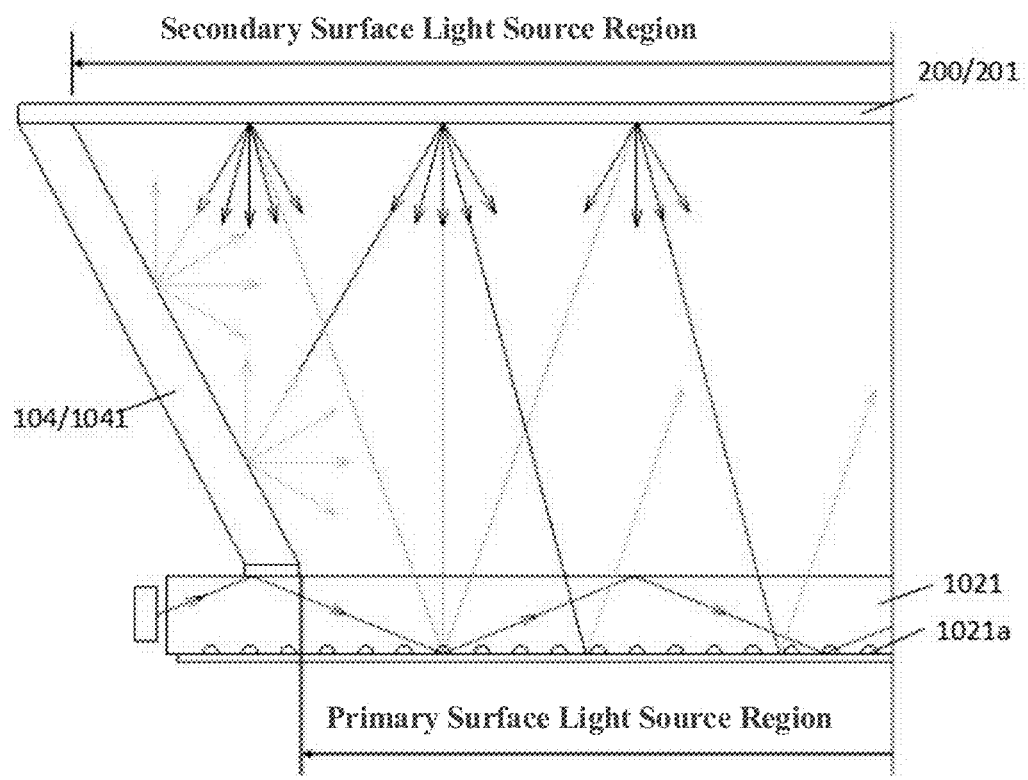
FIG. 11 is an optical path diagram of a light beam after passing through a light guide plate provided by at least one embodiment of the present disclosure.

For example, FIG. 11 is an optical path diagram of a light beam after passing through a light guide plate provided by at least one embodiment of the present disclosure, and FIG. 11 illustrates the display module shown in FIG. 8 by way of example. A surface of the light guide plate 1021 away from the display panel 200 is provided with an auxiliary scattering structure 1021*a*, and the auxiliary scattering structure 1021*a* is configured to scatter the light incident into the light guide plate 1021. The scattered light is reflected by the first strip-shaped portion 1041 included in the middle frame 104, and then the reflected light is directly irradiated on an optical film layer 201 at a side of the display panel 200 close to the light guide plate 1021, thereby improving the peripheral brightness and further improving the peripheral picture uniformity of edge-lit backlight.

For example, as shown in FIG. 11, the auxiliary scattering structure 1021*a* includes a plurality of protrusion structures protruding towards a side close to the display panel 200. The plurality of protrusion structures included in the auxiliary scattering structure 1021*a* are arranged in an array on a surface of the light guide plate 1021 away from the display panel 200, and the plurality of protrusion structures are evenly distributed, so that the light incident into the light guide plate 1021 can be uniformly scattered and that the light exiting the light guide plate 1021 is more uniformly distributed. It should be noted that the auxiliary scattering structure 1021*a* can be other structures in addition to the protrusion structures as long as the light can be scattered, which is not limited in the embodiment of the present disclosure.

For instance, in an example, the light guide plate 1021 is a plate-like member formed of a transparent optical material such as polymethylmethacrylate, and the auxiliary scattering structure 1021*a* is arranged at a surface of the light guide plate 1021 away from the display panel 200. For example, an elevation shape of the auxiliary scattering structure 1021*a* is a spherical shape, and a surface thereof has a fixed curvature. For example, the auxiliary scattering structure 1021*a* may have a spherical structure with a surface curvature of about 0.1 mm, a maximum height of about 0.004 mm and a refractive index of about 1.5. Moreover, a center spacing between adjacent auxiliary scattering structures 1021*a* may be set as 0.075 mm. It should be noted that the material of the light guide plate 1021 is not limited to polymethyl methacrylate but only needs to meet the requirements of high light transmittance and excellent moldability. For example, instead of polymethylmethacrylate, other resin materials such as polycarbonate resin or toughened glass materials can be used as the material of the light guide plate 1021.

For example, as shown in FIG. 11, light emitted by the light-emitting element 103 is incident into the light guide plate 1021 from a surface of the light guide plate 1021 close to the light-emitting element 103. The light emitted by the light-emitting element 103 is propagated inside the light guide plate 1021 and can be totally reflected by the auxiliary scattering structure 1021*a* due to a difference in refractive index between the auxiliary scattering structure 1021*a* provided in the light guide plate 1021 and an air layer, and then the light exits towards the display panel 200 through the surface of the light guide plate 1021 close to the display panel 200.

For instance, in an example, in order to uniform the brightness distribution of the light exiting from the surface of the light guide plate 1021 close to the display panel 200, these auxiliary scattering structures 1021*a* can be arranged at a density which is increased with an increase of a distance from the light-emitting element 103 and is decreased with a decrease of the distance from the light-emitting element 103. The embodiment of the present disclosure is not limited to this. In order to achieve a desirable brightness distribution of the display module, these auxiliary scattering structures 1021*a* can also be configured such that they are uniformly distributed in a central region corresponding to the display panel.

Figure 12:
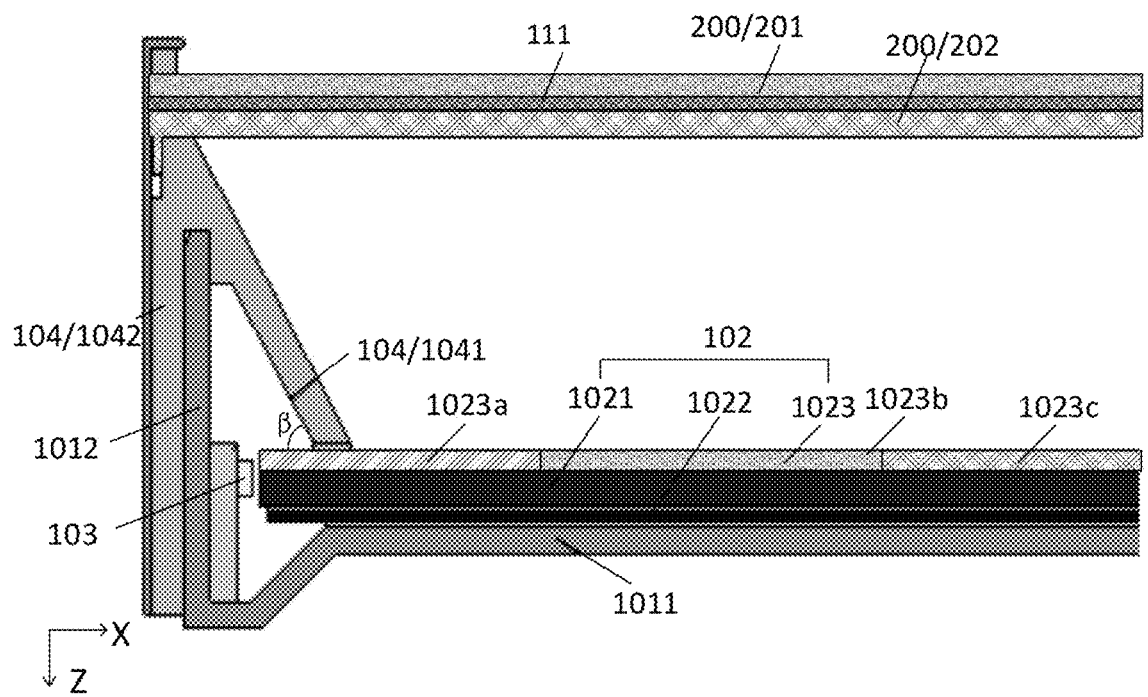
FIG. 12 is a schematic cross-sectional structural view of yet another display module provided by at least one embodiment of the present disclosure.

For example, FIG. 12 is a schematic cross-sectional structural view of yet another display module provided by at least one embodiment of the present disclosure. As shown in FIG. 12, the optical element 102 further includes a quantum dot film layer 1023 arranged at a side of the light guide plate 1021 close to the display panel 200, and the first strip-shaped portion 1041 extends to be above the quantum dot film layer 1023 and is connected with the quantum dot film layer 1023. For example, the first strip-shaped portion 1041 can be connected with the quantum dot film layer 1023 by a direct contact therewith, or the first strip-shaped portion 1041 can be connected with the quantum dot film layer 1023 through an adhesive, as long as the first strip-shaped portion 1041 can be stably formed above the quantum dot film layer 1023, which is not limited in the embodiment of the present disclosure.

For example, the quantum dot film layer 1023 can improve a color gamut displayed by the display module.

For example, as shown in FIG. 12, the optical element 102 extends along the second direction X, or substantially extends along the second direction X. The quantum dot film layer 1023 includes a first quantum dot film layer 1023*a*, a second quantum dot film layer 1023*b* and a third quantum dot film layer 1023*c* which are sequentially arranged adjacent to each other along a direction parallel to the main surface of the display panel 200, for example, along the second direction X, or approximately along the second direction X, and the color of the light emitted by the first quantum dot film layer 1023*a*, the color of the light emitted by the second quantum dot film layer 1023b and the color of the light emitted by the third quantum dot film layer 1023c are different from each other.

For example, the first quantum dot film layer 1023a can convert the light emitted by the light-emitting element 103 into a first light with a different color; the second quantum dot film layer 1023b can convert the light emitted by the light-emitting element 103 into a second light with a different color which is also different from that of the first light; and the third quantum dot film layer 1023c can maintain the color of the light emitted by the light-emitting element 103 unchanged and allow the light to pass through.

For example, in an example, the first quantum dot film layer 1023a includes red quantum dots and a light-transmitting matrix; the second quantum dot film layer 1023b includes green quantum dots and a light-transmitting matrix; and the third quantum dot film layer 1023c includes scattering particles and a light-transmitting matrix. In an example, the light-emitting element is a blue LED, and the light emitted by the light-emitting element is blue light. The blue light passing through the first quantum dot film layer 1023a exists as red light, the blue light passing through the second quantum dot film layer 1023b exists as green light, and the blue light passing through the third quantum dot film layer 1023c exits as blue light.

For example, the matrix includes a transparent resin, and a material of the scattering particles includes a transparent metal oxide. The third quantum dot film layer 1023c mainly functions to scatter the blue light.

Of course, the embodiments of the present disclosure are not limited to this, and light-emitting elements that emit light of other colors can also be adopted.

Figure 13:
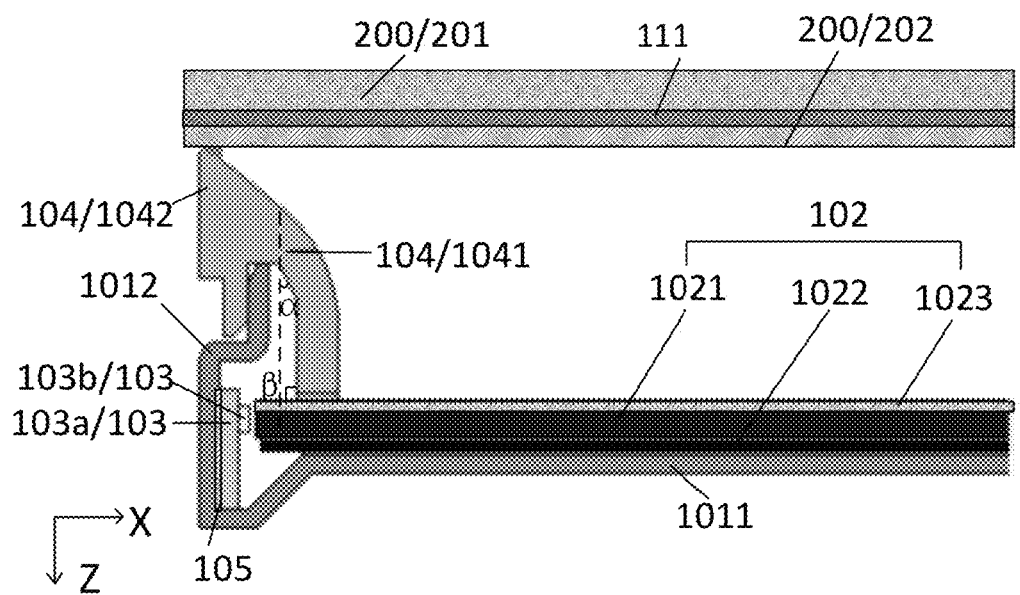
FIG. 13 is a schematic cross-sectional structural view of yet another display module provided by at least one embodiment of the present disclosure.

For example, FIG. 13 is a schematic cross-sectional structural view of yet another display module provided by at least one embodiment of the present disclosure. As shown in FIG. 13, the cross-sectional shape of the first strip-shaped portion 1041 of the middle frame 104 has an arc-shaped structure protruding towards a side away from the side plate 1012, and the arc-shaped structure can uniformly reflect the light incident thereon. A surface of the first strip-shaped portion 1041 away from the side plate 1012 is in an arc shape, and a surface of the first strip-shaped portion 1041 close to the side plate 1012 is in a folded line shape, and the first included angle β between a part of the first strip-shaped portion 1041 close to the optical element 102 and a main surface of the bottom plate 1011 is a right angle, that is, the first included angle β is formed between the part of the first strip-shaped portion 1041 close to the optical element 102 and the second direction X, and the first included angle β is a right angle. The second included angle α formed between at least part of the first strip-shaped portion 1041 and the first direction Z is an acute angle.

For example, as shown in FIG. 13, the optical element 102 further includes a quantum dot film layer 1023 arranged at a side of the light guide plate 1021 close to the display panel 200, and the first strip-shaped portion 1041 extends to be above the quantum dot film layer 1023 and is connected with the quantum dot film layer 1023. For example, the first strip-shaped portion 1041 can be connected with the quantum dot film layer 1023 by a direct contact therewith, or the first strip-shaped portion 1041 can be connected with the quantum dot film layer 1023 through an adhesive, as long as the first strip-shaped portion 1041 can be stably formed above the quantum dot film layer 1023, which is not limited in the embodiment of the present disclosure. The relevant features of the quantum dot film layer 1023 can be found in the above description, and will not be described in details herein.

For example, in combination with FIG. 8 to FIG. 13, the greater the included angle between the part of the first strip-shaped portion 1041 close to the optical element 102 and the main surface of the bottom plate 1011, the smaller a distance between a position where the first strip-shaped portion 1041 is in contact with the optical element 102 and an edge of the optical element 102 close to the light-emitting element 103 along the second direction X, and also the smaller a distance between the position where the first strip-shaped portion 1041 is in contact with the optical element 102 and an edge of the side plate 1012 closet to the light-emitting element 103; in this way, the uniformity of light emitted from the periphery of the display module can be considerably improved.

For example, as shown in FIG. 13, the light-emitting element 103 includes a light-emitting bar 103a and a lamp bead 103b, and the light-emitting bar 103a is connected with a surface of the side plate 1012 close to the optical element 102 through a first adhesive 105. For example, the first adhesive 105 is an optical adhesive, and a material of the first adhesive 105 is not limited in the embodiment of the present disclosure, as long as the light-emitting bar 103a can be connected with the side plate 1012 and the light is allowed to pass through.

Figure 14:
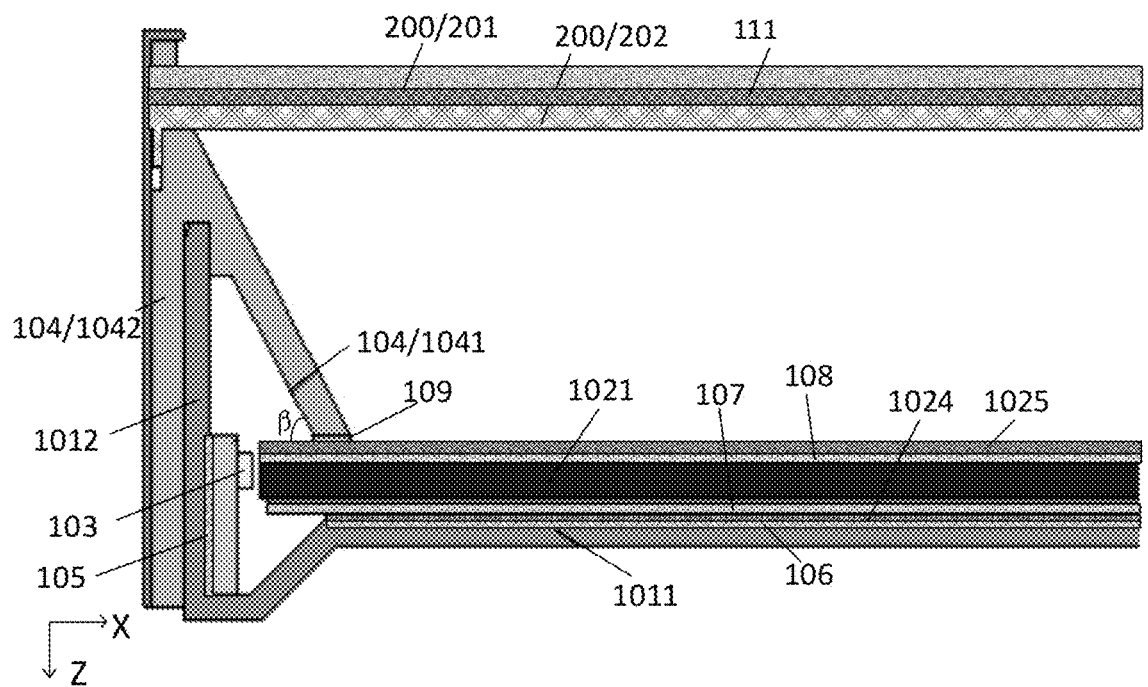
FIG. 14 is a schematic cross-sectional structural view of yet another display module provided by at least one embodiment of the present disclosure.

For example, FIG. 14 is a schematic cross-sectional structural view of yet another display module provided by at least one embodiment of the present disclosure. As shown in FIG. 14, the optical element 102 further includes a reflective structure 1024 arranged at a side of the light guide plate 1021 close to the bottom plate 1011 and a light diffusion structure 1025 arranged at a side of the light guide plate 1021 away from the bottom plate 1011. For example, the reflective structure 1024 can reflect light incident thereon.

For example, the reflective structure 1024 is configured to reflect the light emitted from the surface of the light guide plate 1021 away from the display panel 200 and reuse the reflected light as illumination light for illuminating the display panel 200. For example, the reflective structure 1024 can be a light reflective sheet made of a resin such as polyethylene terephthalate as a base material, or a light reflective sheet formed by vapor deposition of a metal material.

For example, as shown in FIG. 14, the reflective structure 1024 and the bottom plate 1011 are in full-surface bonding with each other through a second adhesive 106; the reflective structure 1024 and the light guide plate 1021 are in full-surface bonding with each other through a third adhesive 107; and the light guide plate 1021 and the light diffusion structure 1025 are in full-surface bonding with each other through a fourth adhesive 108.

For example, materials of the second adhesive 106, the third adhesive 107, the fourth adhesive 108 and a sixth adhesive 109 are not limited in the embodiment of the present disclosure, and the second adhesive 106, the third adhesive 107, the fourth adhesive 108 and the sixth adhesive 109 can be double-sided adhesives, OCA optical adhesives or the like, as long as the corresponding layer structures can be connected and the light is allowed to pass through.

For example, as shown in FIG. 14, a surface of the first strip-shaped portion 1041 close to the light guide plate 1021 and the light diffusion structure 1025 are connected through a sixth adhesive 109. In some other examples, the surface of the first strip-shaped portion 1041 close to the light guide plate 1021 and the light diffusion structure 1025 may also be in direct contact with each other.

Figure 15:
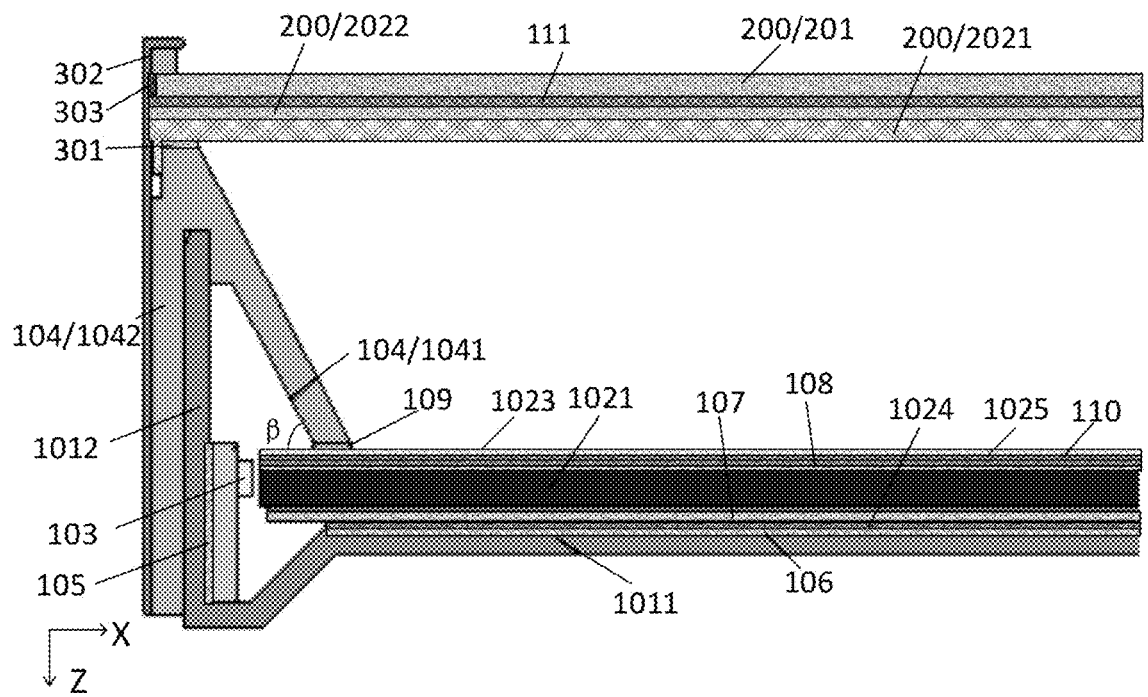
FIG. 15 is a schematic cross-sectional structural view of yet another display module provided by at least one embodiment of the present disclosure.

For example, FIG. 15 is a schematic cross-sectional structural view of yet another display module provided by at least one embodiment of the present disclosure. As shown in FIG. 15, the optical element 102 further includes a reflective structure 1024 arranged at a side of the light guide plate 1021 close to the bottom plate 1011, and a light diffusion structure 1025 arranged between the light guide plate 1021 and the quantum dot film layer 1023. The reflective structure 1024 and the bottom plate 1011 are in full-surface bonding with each other through a second adhesive 106; the reflective structure 1024 and the light guide plate 1021 are in full-surface bonding with each other through a third adhesive 107; the light guide plate 1021 and the light diffusion structure 1025 are in full-surface bonding with each other through a fourth adhesive 108; and the quantum dot film layer 1023 and the light diffusion structure 1025 are in full-surface bonding with each other through a fifth adhesive 110.

For example, materials of the second adhesive 106, the third adhesive 107, the fourth adhesive 108, the fifth adhesive 110 and the sixth adhesive 109 are not limited in the embodiment of the present disclosure, and the second adhesive 106, the third adhesive 107, the fourth adhesive 108, the fifth adhesive 110 and the sixth adhesive 109 can be double-sided adhesives, OCA optical adhesives or the like, as long as the corresponding layer structures can be connected and the light is allowed to pass through.

For example, as shown in FIG. 15, a surface of the first strip-shaped portion 1041 close to the light guide plate 1021 and the quantum dot film layer 1023 are connected through the sixth adhesive 109. In some other examples, the surface of the first strip-shaped portion 1041 close to the light guide plate 1021 and the quantum dot film layer 1023 may also be in direct contact with each other.

For example, in an example, the middle frame 104 and the backplane 1012 are fixedly connected in a snap-fitted manner, and the mode of the fixed connection in a snap-fitted manner can refer to the conventional design, which is not limited in the embodiment of the present disclosure.

For example, as shown in FIG. 8 to FIG. 15, the display panel 200 includes a liquid crystal cell 201 and an optical film layer 202, the optical film layer 202 is arranged at a side of the liquid crystal cell 201 close to the middle frame 104, and the optical film layer 202 and the liquid crystal cell 201 are bonded through a seventh adhesive 111.

For example, as shown in FIG. 15, in an example, the optical film layer 202 may further include a brightness enhancement film 2021 and a diffusion film 2022 which are arranged in a laminated manner, and the diffusion film 2022 is arranged at a side of the brightness enhancement film 2021 close to the liquid crystal cell 201.

For example, in another example, the diffusion film 2022 may include a double-layered structure formed by laminating a first diffusion film with a second diffusion film, and the brightness enhancement film 2021 is sandwiched between the first diffusion film and the second diffusion film layer of the double-layered structure.

For example, in a case that the diffusion film 2022 has a single-layered structure, it includes a diffusion layer, a base substrate and a protective layer; in a case that the diffusion film 2022 includes a double-layered structure formed by laminating a first diffusion film with a second diffusion film, the first diffusion film and the second diffusion film respectively include a diffusion layer, a base substrate and a protective layer. For example, the base substrate is made of a material with high light transmittance such as polyethylene terephthalate (PET) or polycarbonate (PC); and the diffusion layer and the protective layer are made of acrylic resin.

For example, the diffusion film 2022 can diffuse light incident thereon and uniformly distribute the light, so as to ensure the uniformity of display brightness of the display module.

For example, the brightness enhancement film 2021 can ensure the uniformity of the overall brightness of the display module.

For example, the light reflected by the diffusion film 2022 and the brightness enhancement film 2021 is mixed between the optical film layer 202 and the light guide plate 1021, and finally exits through an upper surface of the optical film layer 202 to provide a surface light source for the display panel 200.

For example, the optical film layer 202 may further include an upper prism and a lower prism to improve a frontal brightness or an axial brightness of the display module, and the upper prism and the lower prism may refer to the conventional design, which is not limited in the embodiment of the present disclosure.

For instance, in an example, the optical film layer 202 (including the diffusion film 2022 and the brightness enhancement film 2021 that are laminated) is connected with the middle frame 104 through a first connector 301, and the liquid crystal cell 201 is connected with an outer frame 302 through a second connector 303.

Figure 16:
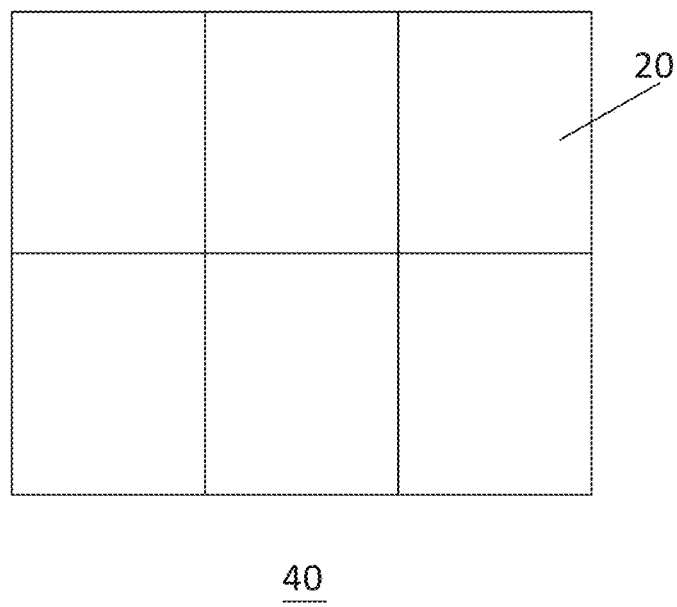
FIG. 16 is a schematic plan view of a display device provided by at least one embodiment of the present disclosure.

At least one embodiment of the present disclosure further provides a display device. For example, FIG. 16 is a schematic plan view of a display device provided by at least one embodiment of the present disclosure. As shown in FIG. 16, the display device 40 includes a splicing screen formed by a plurality of the display modules 10 provided in any of the above embodiments. Although it is shown in FIG. 16 that the display device 40 includes a splicing screen formed by splicing six display modules 10, the embodiments of the present disclosure are not limited to this, and more display modules 10 such as two, four and nine display modules 10 may be included.

For example, the display device 40 further includes a display panel driving part (not shown in the drawings) and a light-emitting element driving part (not shown in the drawings), the display panel driving part is configured to drive the display panel 200 to display and the light-emitting element driving part (not shown in the drawings) is configured to drive the light-emitting element 103 to emit light. Other structures included in the display device 40 can refer to the conventional design, which is not limited in the embodiment of the present disclosure.

For example, the display device includes any of the above display modules, and the display device in the embodiment of the present disclosure can be any product or component with a display function, such as a TV set, a monitor, an electronic paper, a mobile phone, a tablet computer, a notebook computer, a digital photo frame, a navigator, and so on.

For example, in the display device provided by at least one embodiment of the present disclosure, adjacent display modules are spliced by a light-shielding adhesive tape included in each of the display modules.

The display device provided by the embodiment of the present disclosure has the same technical features and working principles as the above-mentioned display module, which will not be repeated in the embodiment of the present disclosure.

The display module and the display device including the display module provided by at least one embodiment of the present disclosure have at least one of the following beneficial technical effects.

(1) The display module provided by at least one embodiment of the present disclosure can solve the problem of light and dark zone occurred at an edge of the display module.

(2) The display module provided by at least one embodiment of the present disclosure combines the characteristics of peripheral picture uniformity of edge-lit backlight with the advantages of realizable ultra-slim bezel of direct-lit backlight. In a case that the display module is applied to a splicing screen product, the uniformity of peripheral brightness of the splicing screen can be ensured, the visual effect of the splicing screen for display can be improved, and also the thickness of the splicing screen product can be reduced.

(3) Based on the structure of the display module provided by at least one embodiment of the present disclosure, a quantum dot film is placed at a side of the light guide plate close to the display panel, an inclined portion of the middle frame shields an edge of the quantum dot film, and a blue-colored LED light bar is utilized in matching therewith, so as to achieve a splicing screen with an ultra-slim bezel and a display effect of high color gamut, and to solve the problem prone to be occurred in the quantum dot film that an invalid blue-colored light-emitting region enters a visual area.

the Following Points Need to be Explained:

(1) The drawings of the embodiment of the present disclosure only relate to the structure related to the embodiment of the present disclosure, and other structures can refer to the general design.

(2) For the sake of clarity, in the drawings used to describe the embodiments of the present disclosure, the thickness of layers or regions is enlarged or reduced, that is, these drawings are not drawn to actual scale.

(3) In the case of no conflict, the embodiments of the present disclosure and the features in the embodiments can be combined with each other to obtain a new embodiment.

The above is only the specific implementation of the present disclosure, but the scope of protection of the present disclosure is not limited thereto, and the scope of protection of the present disclosure should be subject to the scope of protection of the claims.

The invention claimed is:

1. A display module, comprising a backlight module and a display panel, wherein
the backlight module comprises:
a backplane, comprising a bottom plate and a side plate;
an optical element arranged at a side of the bottom plate close to the display panel;
a light-emitting element arranged at a side of the side plate close to the optical element; and
a middle frame arranged between the bottom plate and the display panel, wherein the middle frame comprises a first strip-shaped portion extending to be above the optical element from a position close to the display panel towards a position away from the display panel; a first included angle is formed between at least part of the first strip-shaped portion and a surface of the optical element close to the display panel, and the first included angle is an acute angle or a right angle; an orthographic projection of the first strip-shaped portion on the display panel at least overlaps with an orthographic projection of an edge of the optical element close to the light-emitting element on the display panel,
a direction perpendicular to a main surface of the display panel is a first direction, and the middle frame further comprises a second strip-shaped portion which is approximately parallel to the first direction and extends from a position close to the display panel towards a position away from the display panel along the first direction, and
the second strip-shaped portion is directly connected with the first strip-shaped portion to form a sharp corner portion, and a second angle corresponding to the sharp corner portion is an acute angle.

2. The display module according to claim 1, wherein the optical element comprises a light guide plate configured to receive light emitted from the light-emitting element and to guide the light to the display panel.

3. The display module according to claim 2, wherein a surface of the light guide plate away from the display panel is provided with an auxiliary scattering structure configured to scatter light incident into the light guide plate.

4. The display module according to claim 3, wherein the auxiliary scattering structure comprises a plurality of protrusion structures protruding towards a side close to the display panel.

5. The display module according to claim 2, wherein the optical element further comprises a quantum dot film layer arranged at a side of the light guide plate close to the display panel, and the first strip-shaped portion extends to be above the quantum dot film layer and is connected with the quantum dot film layer.

6. The display module according to claim 5, wherein the quantum dot film layer comprises a first quantum dot film layer, a second quantum dot film layer and a third quantum dot film layer which are sequentially arranged adjacent to each other in a direction parallel to a main surface of the display panel, and a color of light emitted from the first quantum dot film layer, a color of light emitted from the second quantum dot film layer and a color of light emitted from the third quantum dot film layer are different from each other.

7. The display module according to claim 1, wherein a cross-sectional shape of the first strip-shaped portion is a straight line, and the first included angle is an acute angle.

8. The display module according to claim 1, wherein a cross-sectional shape of the first strip-shaped portion is a broken line, and the first included angle formed between a part of the first strip-shaped portion close to the optical element and a main surface of the bottom plate is a right angle.

9. The display module according to claim 1, wherein the light-emitting element and a surface of the side plate close to the optical element are connected through a first adhesive.

10. The display module according to claim 2, wherein the optical element further comprises a reflective structure arranged at a side of the light guide plate close to the bottom plate and a light diffusion structure arranged at a side of the light guide plate away from the bottom plate, wherein the reflective structure and the bottom plate are in full-surface bonding with each other through a second adhesive, the reflective structure and the light guide plate are in full-surface bonding with each other through a third adhesive, and the light guide plate and the light diffusion structure are in full-surface bonding with each other through a fourth adhesive.

11. The display module according to claim 10, wherein a surface of the first strip-shaped portion close to the light guide plate is in direct contact with the light diffusion structure, or the surface of the first strip-shaped portion close to the light guide plate and the light diffusion structure are connected through a sixth adhesive.

12. The display module according to claim 5, wherein the optical element further comprises a reflective structure arranged at a side of the light guide plate close to the bottom plate and a light diffusion structure arranged between the light guide plate and the quantum dot film layer, wherein the reflective structure and the bottom plate are in full-surface bonding with each other through a second adhesive, the reflective structure and the light guide plate are in full-surface bonding with each other through a third adhesive, the light guide plate and the light diffusion structure are in full-surface bonding with each other through a fourth adhesive, and the quantum dot film layer and the light diffusion structure are in full-surface bonding with each other through a fifth adhesive.

13. The display module according to claim 12, wherein a surface of the first strip-shaped portion close to the quantum dot film layer is in direct contact with the quantum dot film layer, or the surface of the first strip-shaped portion close to the quantum dot film layer and the quantum dot film layer are connected through a sixth adhesive.

14. The display module according to claim 1, wherein the middle frame and the backplane are fixedly connected in a snap-fitted manner.

15. The display module according to claim 1, wherein the display panel comprises a liquid crystal cell and an optical film layer, the optical film layer is arranged at a side of the liquid crystal cell close to the optical element, and the optical film layer and the liquid crystal cell are bonded with each other through a seventh adhesive.

16. The display module according to claim 15, wherein the optical film layer comprises a brightness enhancement film and a diffusion film which are arranged in a laminated manner, and the diffusion film is arranged at a side of the brightness enhancement film close to the liquid crystal cell.

17. The display module according to claim 15, wherein an outer frame is arranged at a side of the middle frame away from the optical element, the optical film layer is connected with the middle frame through a first connector, and the liquid crystal cell is connected with the outer frame through a second connector.

18. A display device, comprising a splicing screen formed by a plurality of the display modules according to claim 1.

19. The display device according to claim 18, wherein adjacent display modules are spliced together through a connecting adhesive tape.

* * * * *